United States Patent
Lin

(10) Patent No.: US 9,319,358 B2
(45) Date of Patent: Apr. 19, 2016

(54) TERMINAL INTERACTION METHODS AND RELATED DEVICES AND SYSTEMS

(71) Applicant: Tencent Technology (Shenzhen) Company Limited, Shenzhen (CN)

(72) Inventor: Yao Bin Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 230 days.

(21) Appl. No.: 14/056,834

(22) Filed: Oct. 17, 2013

(65) Prior Publication Data

US 2014/0089432 A1  Mar. 27, 2014

Related U.S. Application Data

(63) Continuation of application No. PCT/CN2013/083329, filed on Sep. 11, 2013.

(30) Foreign Application Priority Data

Sep. 26, 2012  (CN) .......................... 2012 1 0361453

(51) Int. Cl.
   *H04L 12/58*  (2006.01)
(52) U.S. Cl.
   CPC ................ *H04L 51/04* (2013.01); *H04L 51/02* (2013.01); *H04L 51/046* (2013.01)
(58) Field of Classification Search
   CPC ........ H04L 51/04; H04L 51/02; H04L 51/046
   See application file for complete search history.

(56) References Cited

U.S. PATENT DOCUMENTS

| 2004/0260820 A1* | 12/2004 | Bearman ....................... 709/229 |
| 2008/0034064 A1 | 2/2008 | Choi et al. |
| 2008/0201437 A1* | 8/2008 | Ludwig et al. ................ 709/206 |

(Continued)

FOREIGN PATENT DOCUMENTS

| CN | 1719823 | 1/2006 |
| CN | 101808107 | 8/2010 |

(Continued)

OTHER PUBLICATIONS

International Search Report and Written Opinion mailed Dec. 26, 2013, directed to PCT/CN2013/083329; 13 pages.

(Continued)

*Primary Examiner* — Michael C Lai
(74) *Attorney, Agent, or Firm* — Morrison & Foerster LLP

(57) ABSTRACT

This provides a terminal interaction method, device, and system. The method includes: a first IM terminal receiving a user-entered file transfer command directed to a second IM terminal, the two terminals logged into an IM platform using associated account numbers, determining whether the two terminals belong to a same LAN, if yes, starting a local Web server of the first IM terminal and generating URL address information of a file, transmitting, to the second IM terminal, address information of the local Web server and the URL address information of the file, the second IM terminal transmitting, in accordance with the address information of the local Web server, to the local Web server, a file obtaining request including the URL address information of the file, and the local Web server obtaining and transmitting the file to the second IM terminal in accordance with the URL address information of the file.

17 Claims, 6 Drawing Sheets

(56) References Cited

U.S. PATENT DOCUMENTS

2011/0145345 A1* 6/2011 Wysham ............... 709/206
2011/0302414 A1* 12/2011 Logan et al. .......... 713/168

FOREIGN PATENT DOCUMENTS

| CN | 102149014 | 8/2011 |
| CN | 102244617 | 11/2011 |

OTHER PUBLICATIONS

First Office Action mailed Jul. 28, 2014, directed to CN Application No. 201210361453.8 with concise explanation of relevancy; 13 pages.

Second Office Action mailed Mar. 11, 2015, directed to CN Application No. 201210361453.8 with concise explanation of relevancy; 4 pages.

* cited by examiner

TERMINAL INTERACTION METHODS AND RELATED DEVICES AND SYSTEMS

CROSS REFERENCE TO RELATED APPLICATION

This application is a U.S. continuation application filed under 35 U.S.C. §111(a) claiming priority under 35 U.S.C. §§120 and 365(c) to International Application No. PCT/CN2013/083329 filed Sep. 11, 2013, which claims the priority benefit of Chinese Patent Application No. 201210361453.8, filed on Sep. 26, 2012, the contents of both the PCT application and the Chinese application are incorporated by reference herein in their entirety for all purposes.

FIELD

The present disclosure relates to Internet technologies, and in particular, to a terminal interaction method, device, and system.

BACKGROUND

In daily life, people often need to exchange image, video, text and other types of files between, for example, a personal computer (PC) and a mobile phone. To facilitate this interaction between the PC and the mobile phone, a communication channel has to be first established between the PC and the mobile phone. In practice, the communication channel between the PC and the mobile phone is usually implemented using a wired connection (e.g., a USB cable). However, a wired connection has limitations that reduce the easiness of user operations.

SUMMARY

Embodiments of the present disclosure can provide a terminal interaction method, device, and system.

In a first embodiment of the disclosure, a terminal interaction method is provided. The method can include the following exemplary steps A first instant messaging (IM) terminal can receive a user-entered file transfer command directed to a second IM terminal, wherein the first IM terminal and the second IM terminal can log into an IM platform using associated account numbers.

The first IM terminal can determine whether the first IM terminal and the second IM terminal belong to a same LAN. If yes, a local Web server at the first IM terminal can be started and a Uniform/Universal Resource Locator (URL) address associated with a file can be generated.

The first IM terminal can transmit, via the IM platform, to the second IM terminal, address information associated with the local Web server and the URL address information associated with the file.

The second IM terminal can transmit, to the local Web server, in accordance with the address information associated with the local Web server, a file obtaining request including the URL address information associated with the file.

The local Web server can obtain and transmit the file to the second IM terminal in accordance with the URL address information associated with the file.

In a second embodiment of the disclosure, another terminal interaction method can be provided. The method can include the following exemplary steps.

A first IM terminal can receive a user-entered file transfer command directed to a second IM terminal, wherein the first IM terminal and the second IM terminal can log into an IM platform via associated account numbers.

The first IM terminal can determine whether the first IM terminal and the second IM terminal belong to a same LAN and, if yes, start a local Web server associated with the first IM terminal and generate URL address information associated with the file.

The first IM terminal can transmit, via the IM platform, to the second IM terminal, the address information associated with the local Web server and the URL address information associated with the file, to allow the second IM terminal to transmit, to the local Web server, in accordance with the address information associated with the local Web server, a file obtaining request including the URL address information associated with the file, and the local Web server to obtain and transmit to the second IM terminal the file in accordance with the URL address information associated with the file.

In a third embodiment of the disclosure, a first IM terminal is provided. The first IM terminal can include the following units.

A receiving unit that receives a user-entered file transfer command directed to a second IM terminal, wherein the first IM terminal and the second IM terminal are logged into an IM platform via associated account numbers.

A determining unit that determines whether the first IM terminal and the second IM terminal belong to the same local area network (LAN).

A first processing unit that starts a local Web server on the first IM terminal and generates URL address information associated with a file when the result of the determining unit's determination is positive.

A first transmitting unit that transmits to the second IM terminal the address associated with the local Web server and the URL address information associated with the file via the IM platform to allow the second IM terminal to transmit to the local Web server a file obtaining request including the URL address information associated with the file in accordance with the address information about the local Web server, and the local Web server to obtain and transmit the file to the second IM terminal in accordance with the URL address information.

In a fourth embodiment, a second IM terminal is provided. The second IM terminal can include the following exemplary units.

A receiving unit that receives address information associated with a local Web server and URL address information associated with a file transmitted by a first IM terminal via an IM platform, the address information associated with the local Web server and the URL address information associated with the file can be transmitted after the first IM terminal receives a user-entered file transfer command directed to the second IM terminal and after the first IM terminal determines that the first IM terminal and the second IM terminal belong to the same LAN, the first IM terminal and the second IM terminal logged into the IM platform via associated account numbers.

A transmitting unit that transmits to the local Web server, in accordance with the address information associated with the local Web server, a file obtaining request including the URL address information associated with the file.

The receiving unit also receives the file obtained and transmitted by the local Web server in accordance with the URL address information associated with the file.

In a fifth embodiment of the disclosure, a terminal interaction system is provided. The system can include a first IM terminal and a second IM terminal.

The first IM terminal receives a user-entered file transfer command directed to the second IM terminal, wherein the first IM terminal and the second IM terminal are logged into an IM platform via associated account numbers.

The first IM terminal determines whether the first IM terminal and the second IM terminal belong to the same LAN, if they do, starts a local Web server and generates URL address information associated with the file.

The first IM terminal sends, via the IM platform, to the second IM terminal, the address information associated with the local Web server and the URL address information associated with the file.

The second IM terminal sends to the local Web server, in accordance with the address information associated with the local Web server, a file obtaining request including the URL address information associated with the file.

The local Web server obtains and transmits the file to the second IM terminal in accordance with the URL address information of the file.

In the embodiments, the first IM terminal and the second IM terminal can log onto the IM platform using associated account numbers. This can allow the first IM terminal to determine whether the first IM terminal and the second IM terminal are connected to the same LAN after the first IM terminal receives a user-entered file transfer command directed to the second IM terminal. If they are connected to the same LAN, a local Web server associated with the first IM terminal can be started and URL address information associated with a file can be generated. The address information associated with the local Web server and the URL address information of the file can be transmitted to the second IM terminal via the IM platform. The second IM terminal can transmit the file transfer request including the URL address information of the file to a local Web server in accordance with the address information associated with the local Web server. Finally, the local Web server can obtain the file and transmit it to the second IM terminal in accordance with the URL address information. As such, the first IM terminal and the second IM terminal of the embodiments can facilitate file exchanges in the background via the local Web server. This can overcome the limitations associated with wired connections, and thus improving the easiness of the operations.

DETAILED DESCRIPTION

A detailed description of the technical solutions of the embodiments of the present disclosure is provided below in view of the accompanying drawings. It should be understood that the embodiments described below are representative embodiments of the present disclosure rather than a complete disclosure of the every possible embodiment. The present disclosure can also include any other embodiments that can be derived from these disclosed embodiments by a person with ordinary skill in the art without any additional inventive work. It is to be understood that other embodiments can be used and structural changes can be made without departing from the scope of the embodiments of this disclosure.

This generally relates to terminal interactions and file exchanges between two or more terminals. It should be understood that the data being shared among the terminals can be of any type, including text, image, video, audio, etc. As referred hereinafter, a terminal can be any electronic device capable of connecting to a network for transmitting and receiving data. Such devices can include, but are not limited to, PCs, Macs, desktop computers, laptop computers, tablet PCs, smartphones including iPhones, Android phones, Windows phones, and Blackberries, e-readers, in-car communication devices, televisions and other consumer electronic devices with sufficient network capabilities. In fact, a terminal can also be referred to as a device (i.e., "device" and "terminal" are interchangeable terms).

The embodiments discussed below refer to first and/or second instant messaging terminals. It should be understood that the first/second instant messaging terminals can be capable of running an instant messaging application hosted on an instant messaging platform. It should also be understood that the first/second instant messaging terminals do not have to be dedicated instant messaging terminals, but can be any devices such as the ones discussed above with instant messaging capability.

In some of the embodiments, one of the terminals (e.g., the first instant messaging terminal) can be associated with a local Web server. The local Web server can be any suitable Web server, including but not limited to, Internet Information Services (IIS), IBM HTTP server, and Google Web Server.

Figure 1:
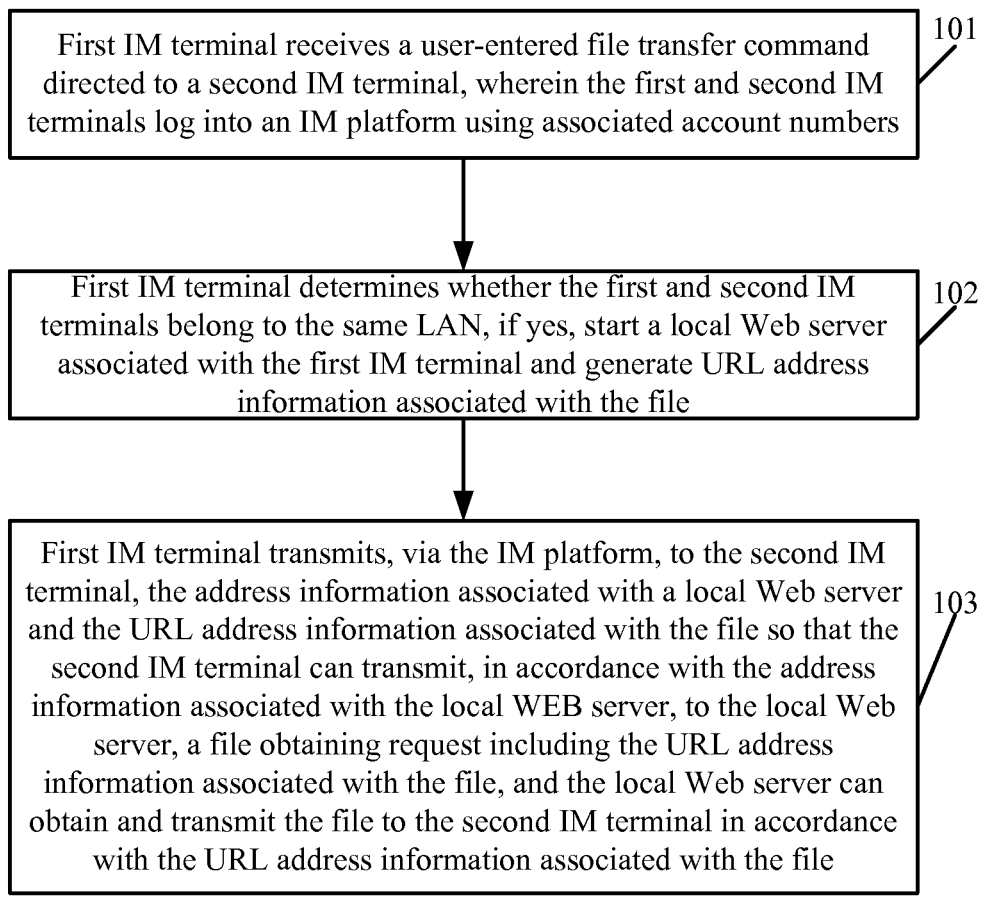
FIG. 1 is a flowchart illustrated the exemplary steps of a terminal interaction method, according to an embodiment of the present disclosure.

Referring to FIG. 1, FIG. 1 is a flowchart illustrated the exemplary steps of a terminal interaction method, according to an embodiment of the present disclosure. As illustrated in FIG. 1, the terminal interaction method can include the following steps.

101. A first IM terminal can receive a user-entered file transfer command directed to a second IM terminal, wherein the first IM terminal and the second IM terminal can separately log into an IM platform using associated account numbers.

In the embodiment of the present disclosure, the first IM terminal and the second IM terminal can be PCs or smartphones such as iPhones, Android phones, other Mobile Internet Devices ("MID"), or other smart mobile terminals. The embodiments of the present disclosure do not include any restrictions in this regard.

In this embodiment of the present disclosure, the associated account numbers can be the same account number, friends' account numbers, or a group account number. The embodiments of the present disclosure do not include any restrictions in this regard.

In the embodiment of the present disclosure, the above-described file can include, but is not limited to, a video or a text document.

Optionally, a user can search for the second IM terminal on the IM platform of the first IM terminal. The user can also open a file transmitting window by clicking on the second IM terminal once it is located. In addition, the user can drag or copy an image from the file manager of the first IM terminal into the file transmitting window as a way of entering at the first IM terminal a file transfer command directed to the second IM terminal. The file transfer command can also be entered using other suitable methods known in the art.

102. The first IM terminal can determine whether the first IM terminal and the second IM terminal belong to the same LAN. If they do, a local Web server associated with the first IM terminal can be started and URL address information associated with the file can be generated.

Optionally, the first IM terminal can transmit to the second IM terminal an Address Resolution Protocol (ARP) request package and detect whether a media access control (MAC) address returned from the second IM terminal is received within a set time (e.g., 5 second). If yes, it can be determined that the first IM terminal and the second IM terminal belong to the same LAN. If not, it can be determined that the first IM terminal and the second IM terminal do not belong to the same LAN.

In this embodiment of the present disclosure, the first IM terminal can map an actual file storage path to an accessible URL address to obtain the URL address information associated with the file.

103. The first IM terminal can transmit, via the IM platform, to the second IM terminal, the address information associated with a local Web server and the URL address information associated with the file so that the second IM terminal can transmit, in accordance with the address information associated with the local WEB server, to the local Web server, a file obtaining request including the URL address information associated with the file. The local Web server can obtain and transmit the file to the second IM terminal in accordance with the URL address information associated with the file.

Alternatively, before the first IM terminal transmits to the second IM terminal, via the IM platform, the address information of the local WEB server and the URL address information associated with the file as described above in step 103, the first IM terminal can first encrypt the address information of the local WEB server and the URL address information associated with the file before transmitting the information to the second IM terminal via the IM platform. This way, the address information associated with the local WEB server and the URL address information associated with the file can be protected effectively from malicious attacks that can result in the second IM terminal failing to obtain the correct file.

Alternatively, in the above-described step 102, if the first IM terminal detects that the first IM terminal and the second IM terminal do not belong to the same LAN, the terminal interaction method, as illustrated in FIG. 1, can also include following steps.

1) The first IM terminal can upload the file to a hub device and generate hub device URL address information associated with the file.

2) The first IM terminal can transmit to the second IM terminal via the IM platform the address information of the hub device and the hub device URL address information associated with the file so that the second IM terminal can transmit, in accordance with the address information of the hub device, a file obtaining request including the Hub device URL address information associated with the file to the hub device and the hub device can obtain and transmit the file to the second IM terminal in accordance with the Hub device URL address information associated with the file.

In this embodiment of the present disclosure, steps 1 and 2 can allow the first IM terminal and the second IM terminal to achieve file transmission in different network environments when the terminals do not belong to the same network. As such, the disclosure can have broad application prospects.

Alternatively, before the first IM terminal transmits the address information of the hub device and the hub device URL address information associated with the file to the second IM terminal via the IM platform as described above in step 2, the first IM terminal can first encrypt the address information of the hub device and the Hub device URL address information associated with the file before transmitting this information to the second IM terminal via the IM platform. This way, the address information of the hub device and the Hub device URL address information associated with the file can be protected effectively from malicious attacks that can result in the second IM terminal failing to obtain the correct file.

In this embodiment of the present disclosure, whether it is the local Web server or the hub device that transmits the file to the second IM terminal, the second IM terminal can display the percentage of the file transmitted so that the user can know whether file download has been completed.

In the terminal interaction method illustrated in FIG. 1, the first IM terminal and the second IM terminal can facilitate the exchange of files in the background through a local Web server. This type of interactions can overcome the limitations of a wired connection and make the operations more convenient.

Figure 2:
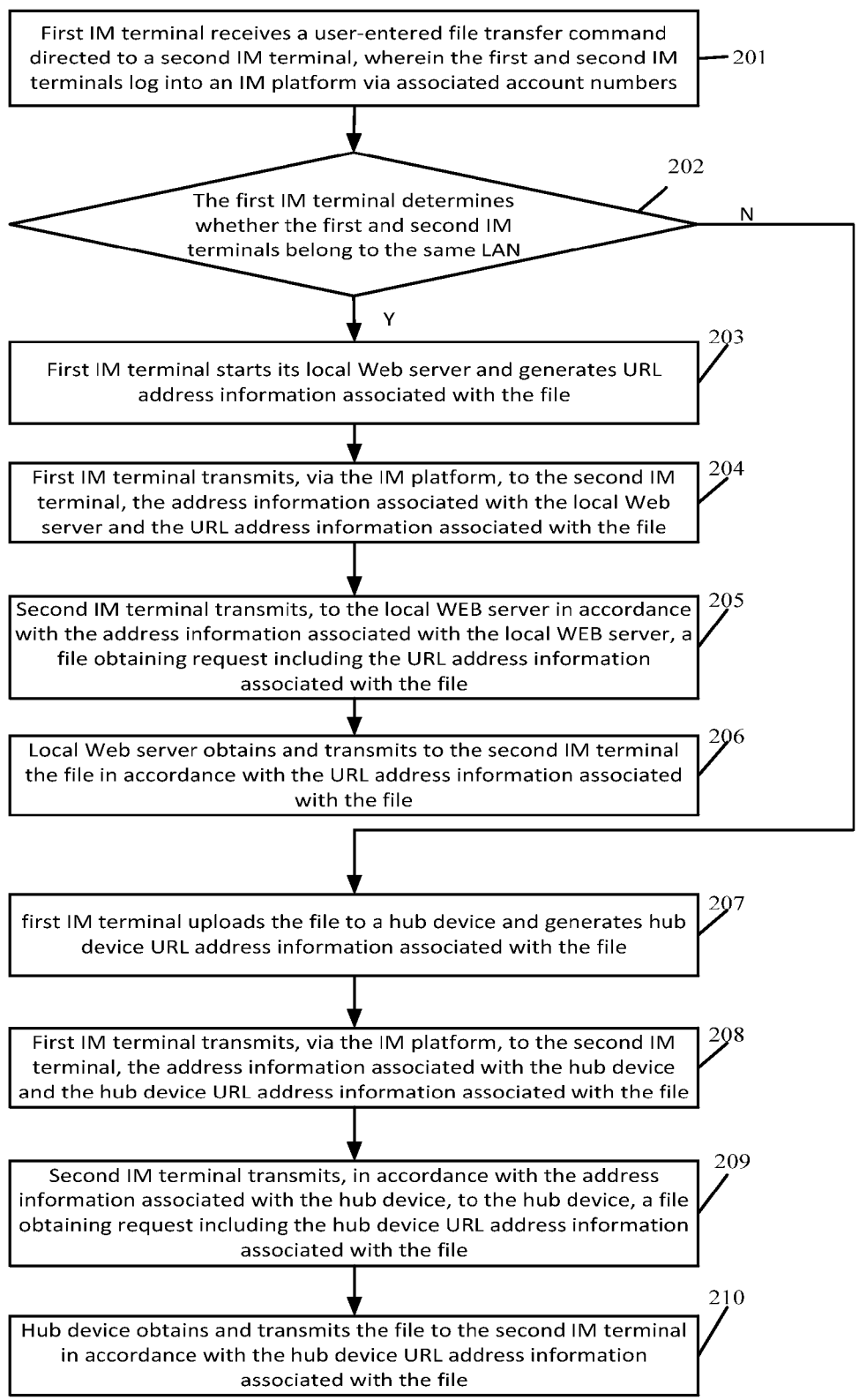
FIG. 2 is a flowchart illustrating the exemplary steps of another terminal interaction method, according to an embodiment of the present disclosure.

Referring to FIG. 2, FIG. 2 is a flowchart illustrating the various steps of another terminal interaction method, according to an embodiment of the present disclosure. As shown in FIG. 2, the terminal interaction method may include the following steps.

201. A first IM terminal can receive a user-entered file transfer command directed to a second IM terminal, wherein the first IM terminal and the second IM terminal can separately log into an IM platform via associated account numbers.

202. The first IM terminal can determine whether the first IM terminal and the second IM terminal belong to the same LAN and, if yes, process with steps 203-206; and if not, proceed with step 207.

Alternatively, the first IM terminal can transmit to the second IM terminal an ARP protocol request package and detect whether a MAC address returned from the second IM terminal is received within a set time (e.g., 5 second). If yes, it can be determined that the first IM terminal and the second IM terminal belong to the same LAN and steps 203-206 can be performed. If not, it can be determined that the first IM terminal and the second IM terminal do not belong to the same LAN and steps 207-210 can be performed.

203. The first IM terminal can start its local Web server and generate URL address information associated with the file.

204. The first IM terminal can transmit, via the IM platform, to the second IM terminal, the address information associated with the local Web server and the URL address information associated with the file.

Alternatively, the first IM terminal may first encrypt the address information associated with the local Web server and the URL address information associated with the file before step 204 is performed. This way, the address information associated with the local WEB server and the URL address information associated with the file can be protected effectively from malicious attacks that can result in the second IM terminal failing to accurately obtain the file.

205. The second IM terminal can transmit, to the local WEB server in accordance with the address information associated with the local WEB server, a file obtaining request including the URL address information associated with the file.

In this embodiment of the present disclosure, the second IM terminal can transmit to the local Web server associated with the first IM terminal a file obtaining request including the URL address information associated with the file using the "Get" method of the standard Http protocol.

206. The local Web server can obtain and transmit to the second IM terminal the file in accordance with the URL address information associated with the file and then the process can end.

In this embodiment of the present disclosure, if the first IM terminal determines that the first IM terminal the second IM terminal do not belong to one LAN in step 202, the following steps 207 to 210 can be performed.

207. The first IM terminal can upload the file to a hub device and generate hub device URL address information associated with the file.

208. The first IM terminal can transmit, via the IM platform, to the second IM terminal, the address information associated with the hub device and the hub device URL address information associated with the file.

Alternatively, the first IM terminal can first encrypt the address information associated with the hub device and the hub device URL address information associated with the file before performing step 208. This way, the address information associated with the hub device and the Hub device URL address information associated with the file can be protected effectively from malicious attacks that can result in the second IM terminal failing to obtain the correct file.

209. The second IM terminal can transmit, in accordance with the address information associated with the hub device, to the hub device, a file obtaining request including the hub device URL address information associated with the file.

210. The hub device can obtain and transmit the file to the second IM terminal in accordance with the hub device URL address information associated with the file and the process can then end.

In the terminal interaction method illustrated in FIG. 2, the first IM terminal and the second IM terminal can facilitate the exchange of files in the background through a local WEB server. This type of interactions can overcome the limitations of a wired connection and make the operations more convenient.

Figure 3:
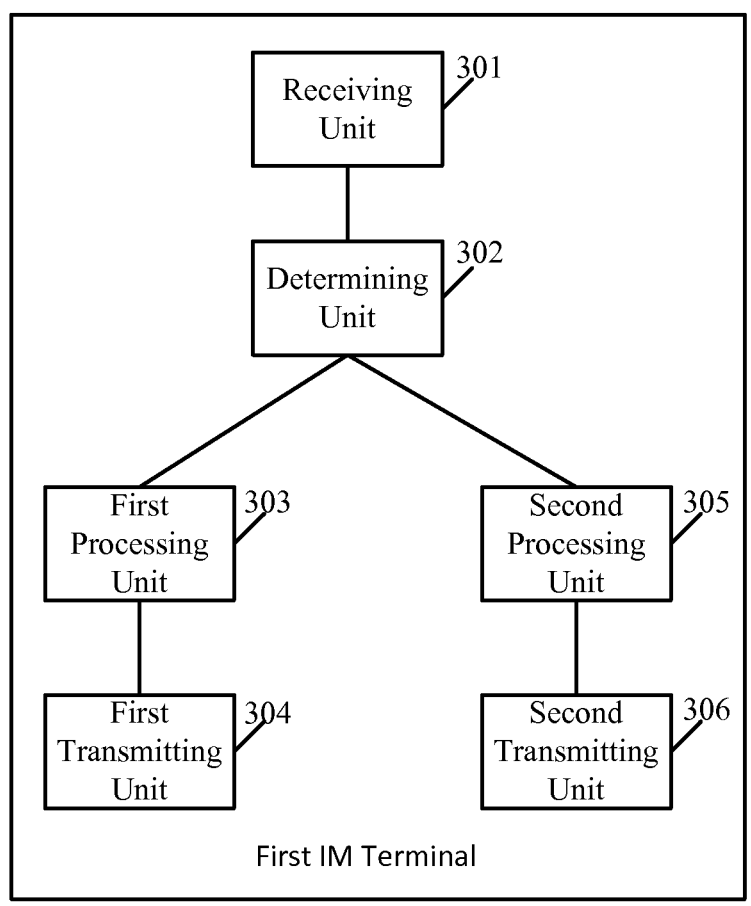
FIG. 3 is a block diagram illustrating the exemplary structure of an IM terminal, according to an embodiment of the present disclosure.

Referring to FIG. 3, FIG. 3 is a block diagram illustrating an exemplary structure of a first IM terminal, according to an embodiment of the present disclosure. As shown in FIG. 3, the structure of the first IM terminal can include the following exemplary units.

Receiving Unit 301, which can receive a user-entered file transfer command directed to a second IM terminal, wherein the first IM terminal and the second IM terminal can separately log into an IM platform via associated account numbers.

Determining Unit 302, which can determine whether the first IM terminal and the second IM terminal belong to the same LAN.

First Processing Unit 303, which can start a local Web server associated with the first IM terminal and generate URL address information associated with a file when the result of the Determining Unit 302's determination is positive.

First Transmitting Unit 304, which can transmit to the second IM terminal the address associated with the local Web server and the URL address information associated with the file via the IM platform so that the second IM terminal can transmit to the local Web server a file obtaining request including the URL address information associated with the file in accordance with the address information associated with the local Web server. The local Web server can obtain and transmit the file to the second IM terminal in accordance with the URL address information.

Alternatively, as illustrated in FIG. 3, the IM terminal may also include the following exemplary units.

Second Processing Unit 305, which can upload the file to a hub device and generate hub device URL address information associated with the file when the result of the Determining Unit 302's determination is negative.

Second Transmitting Unit 306, which can transmit, via the IM platform, to the second IM terminal, the address information associated with the hub device and the hub device URL address information associated with the file so that the second IM terminal can transmit to the hub device a file obtaining request including the hub device URL address information associated with the file in accordance with the address information associated with the hub device. The hub device can obtain and transmit the file to the second IM terminal in accordance with the hub device URL address information associated with the file.

Alternatively, Determining Unit 302 can transmit to the second IM terminal an ARP protocol request package and detect whether a MAC address returned from the second IM terminal is received within a set time (e.g., 5 second). If yes, it can be determined that the first IM terminal and the second IM terminal belong to the same LAN; if no, it can be determined that the first IM terminal and the second IM terminal do not belong to the same LAN.

Figure 4:
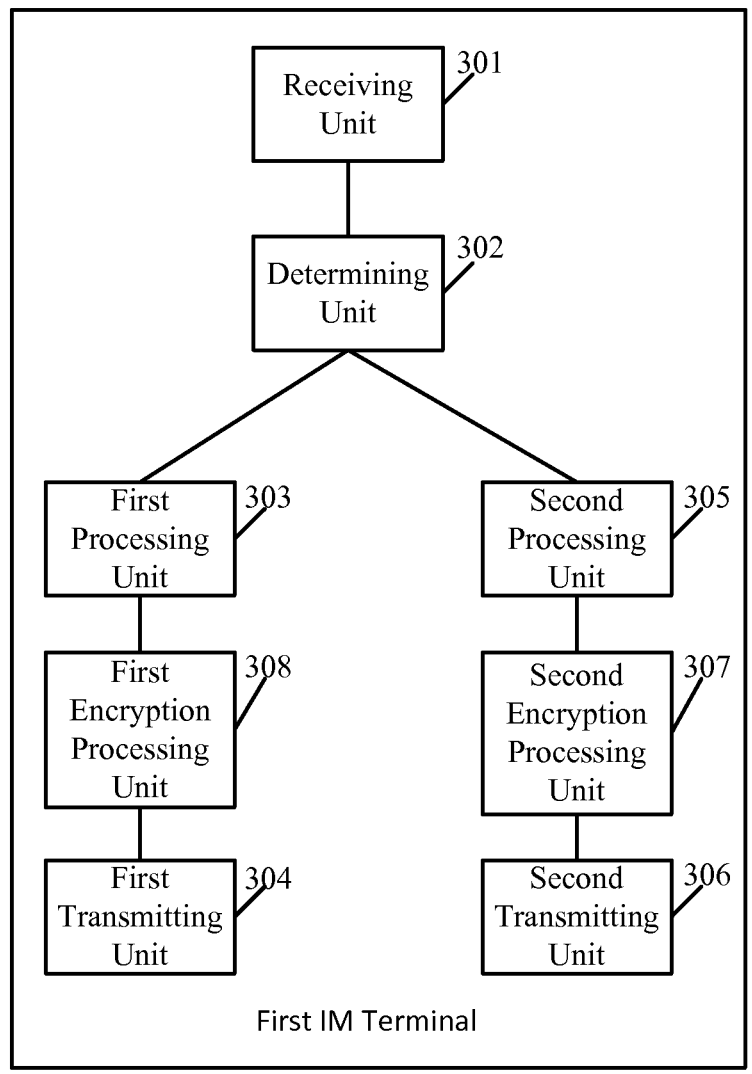
FIG. 4 is a block diagram illustrating the exemplary structure of another IM terminal, according to an embodiment of the present disclosure.

Also referring to FIG. 4, FIG. 4 is a block diagram illustrating the exemplary structure of a first IM terminal, according to an embodiment of the present disclosure. The first IM terminal illustrated in FIG. 4 can be an optimized version of the first IM terminal of FIG. 3. In comparison with the first IM terminal of FIG. 3, the IM terminal of FIG. 4 can also include the following exemplary units.

Second Encryption Processing Unit 307, which can, before the Second Transmitting Unit 306 transmits, via the IM platform, to the second IM terminal, the address information associated with the hub device and the hub device URL address information associated with the file, first encrypt the address information associated with the hub device and the hub device URL address information associated with the file and transmit the encrypted information to Second Transmitting Unit 306. This way, the address information associated with the hub device and the hub device URL address information associated with the file can be protected effectively from malicious attacks that can result in the second IM terminal failing to obtain the correct file.

In comparison with the first IM terminal illustrated in FIG. 3, the first IM terminal illustrated in FIG. 4 can also include the following exemplary units.

First Encryption Processing Unit 308, which can, before the first Transmitting Unit 304 transmits to the second IM terminal the address information associated with the local Web server and the URL address information associated with the file via the IM platform, first encrypt the address information associated with the local Web server and the URL address information associated with the file and transmit this information to First Transmitting Unit 304. This way, the address information associated with the local Web server and the URL address information associated with the file can be protected effectively from malicious attacks that can result in the second IM terminal failing to obtain the correct file.

In this embodiment of the present disclosure, the first IM terminals illustrated in FIGS. 3 and 4 and the second IM terminal can facilitate the exchange of files in the background through a local Web server. This type of interactions can overcome the limitations of a wired connection and make the operations more convenient.

Figure 5:
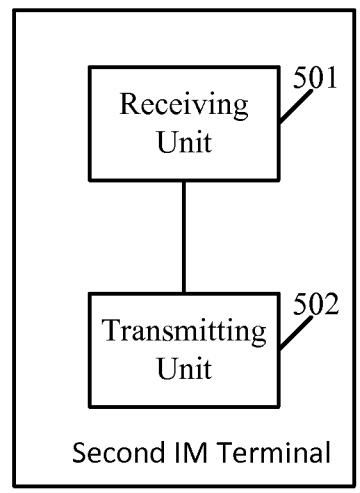
FIG. 5 is a block diagram illustrating the exemplary structure of yet another IM terminal, according to an embodiment of the present disclosure.

Referring to FIG. 5, FIG. 5 is a block diagram illustrating the exemplary structure of a second IM terminal, according to an embodiment of the present disclosure. As illustrated in FIG. 5, the structure of the second IM terminal may include the following exemplary units.

Receiving Unit 501, which can receive the address information associated with the local Web server and the URL address information associated with the file transmitted by a first IM terminal via an IM platform. The address information associated with the local Web server and the URL address information associated with the file can be transmitted after the first IM terminal receives a user-entered file transfer command directed to the second IM terminal and after the first IM terminal determines that the first IM terminal and the second IM terminal belong to the same LAN. The first IM terminal and the second IM terminal can separately log into the IM platform via associated account numbers.

Transmitting Unit 502, which can transmit, in accordance with the address information associated with the local Web server, to the local Web server, a file obtaining request including the URL address information associated with the file.

The above-described Receiving Unit 501 can also receive the file obtained and transmitted by the local Web server in accordance with the URL address information associated with the file.

In the second IM terminal illustrated in FIG. 5, Receiving Unit 501 can also receive the address information associated with the hub device and the hub device URL address information associated with the file transmitted by the first IM terminal. The address information associated with the local Web server and the URL address information associated with the file can be transmitted after the first IM terminal receives a user-entered file transfer command directed to the second IM terminal and after the first IM terminal determines that the first IM terminal and the second IM terminal do not belong to the same LAN, uploads the file to the hub device, and generates the hub device URL address information associated with the file.

Accordingly, Transmitting Unit 502 can also transmit, in accordance with the address information associated with the hub device, to the hub device, a file obtaining request including the hub device URL address information associated with the file.

Accordingly, Receiving Unit 501 can also receive the file obtained and downloaded by the hub device in accordance with the hub device URL address information associated with the file.

Figure 6:
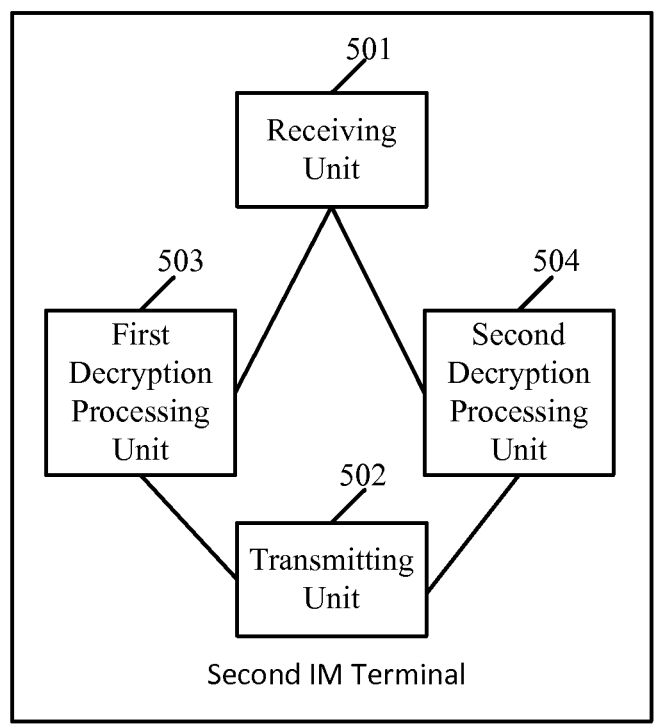
FIG. 6 is a block diagram illustrating the exemplary structure of another IM terminal, according to an embodiment of the present disclosure.

Also referring to FIG. 6, FIG. 6 is a block diagram illustrating the exemplary structure of a second IM terminal, according to an embodiment of the present disclosure. The second IM terminal illustrated in FIG. 6 can be an optimized version of the second IM terminal illustrated in FIG. 5. In comparison with the second IM terminal illustrated in FIG. 5, the second IM terminal illustrated in FIG. 6 can also include a First Decryption Processing Unit 503 and a Second Decryption Processing Unit 504. When the address information associated with the local Web server and the URL address information associated with the file transmitted by the first IM terminal via an IM terminal are encrypted, the First Decryption Processing Unit 503 can decrypt the address information associated with the local Web server and the URL address information associated with the file received by the Receiving Unit 501 and transmit the decrypted information to Transmitting Unit 502. When the address information associated with the local Web server and the URL address information associated with the file transmitted by the first IM terminal via an IM terminal are not encrypted, the First Decryption Processing Unit 503 can perform a transparent transmission of this information. When the address information associated with the hub device and the hub device URL address information associated with the file transmitted by the first IM terminal via an IM terminal are encrypted, Second Decryption Processing Unit 504 can decrypt the address information associate with the hub device and the hub device URL address information associated with the file received by Receiving Unit 501 and transmit this information to Transmitting Unit 502. When the address information associated with the hub device and the hub device URL address information associated with the file transmitted by the first IM terminal via an IM terminal are not encrypted, Second Decryption Processing Unit 504 can perform a transparent transmission of this information.

In this embodiment of the present disclosure, the second IM terminals described in FIGS. 5 and 6 and the first IM terminal can facilitate the exchange of files in the background through a local Web server. This type of interactions can overcome the limitations of a wired connection and make the operations more convenient.

Figure 7:
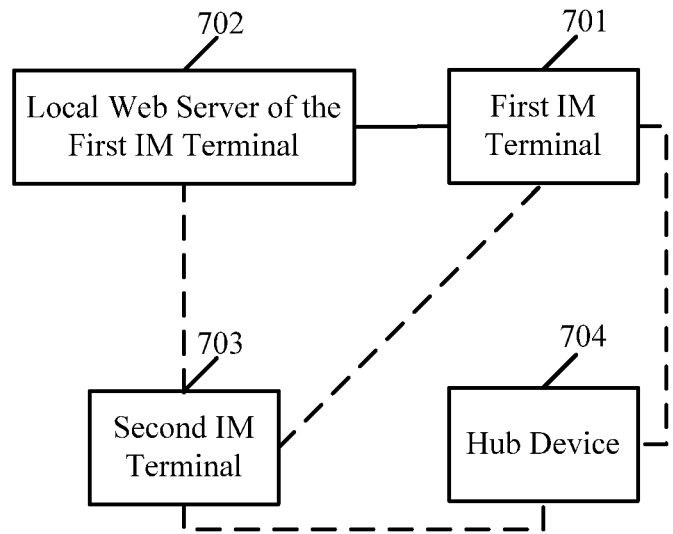
FIG. 7 is block diagram illustrating an exemplary structure of a terminal interaction system, according to an embodiment of the present disclosure.

Referring to FIG. 7, FIG. 7 is a block diagram of an exemplary structure of a terminal interaction system, according to an embodiment of the present disclosure. As shown in FIG. 7, the terminal interaction system can include a First IM terminal 701, a Local Web Server 702 associated with the First IM Terminal, and a Second IM Terminal 703. The dotted lines can indicate wireless connection while the solid lines can represent that the Local Web Server 702 can be built as a part of the First IM Terminal 701.

In this embodiment, First IM Terminal 701 can receive a user-entered file transfer command directed to the Second IM Terminal 703, wherein the First IM Terminal 701 and the Second IM Terminal 703 can separately log into an IM platform, via associated account numbers.

The First IM Terminal 701 can determine whether the First IM Terminal 701 and the Second IM Terminal 703 belong to the same LAN. If yes, the Local Web Server 702 can be started and URL address information associated with the file can be generated.

First IM Terminal 701 can transmit, via the IM platform, to the Second IM Terminal 703, the address information associated with the Local Web Server 702 and the URL address information associated with the file.

Second IM Terminal 703 can transmit, in accordance with the address information associated with the Local Web Server 702, to the Local Web Server 702, a file obtaining request including the URL address information associated with the file.

Local Web Server 702 can obtain and transmit the file to the Second IM Terminal 703 in accordance with the URL address information.

Alternatively, as shown in FIG. 7, the interaction system can also include a Hub Device 704.

In this embodiment, the First IM Terminal 701 can determine whether the First IM Terminal 701 and the Second IM Terminal 703 belong to the same LAN. If not, the file can be uploaded to the Hub Device 704 and the URL address information associated with the file can be generated in the Hub Device 704.

First IM Terminal 701 can also transmit, via the IM platform, to the Second IM Terminal 703, the address information associated with the Hub Device 704 and the hub device URL address information associated with the file 704.

Second IM Terminal 703 can transmit, in accordance with the address information associated the Hub Device 704, to the Hub Device 704, a file obtaining request including the hub device URL address information associated with the file 704.

Hub Device 704 can obtain and transmit the file to the Second IM Terminal 703 in accordance with the hub device URL address information associated with the file.

In the terminal interaction system illustrated in FIG. 7, the first IM terminal and the second IM terminal can facilitate the exchange of files in the background through a local WEB server. This type of interactions can overcome the limitations of a wired connection and make the operations more convenient.

Based on the above-described embodiments, a person skilled in the art can understand that parts of or the whole process described in each of the above embodiments can be performed by hardware in accordance with instructions from one or more computer programs. The one or more computer programs can be stored in a non-transitory readable medium, and when executed, perform the processes described in these embodiments. The non-transitory computer readable medium can be a floppy disk, CD, read-only memory (ROM), or random access memory (RAM).

In some embodiments, one or more of the units in FIGS. 3-7 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this file, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 8:
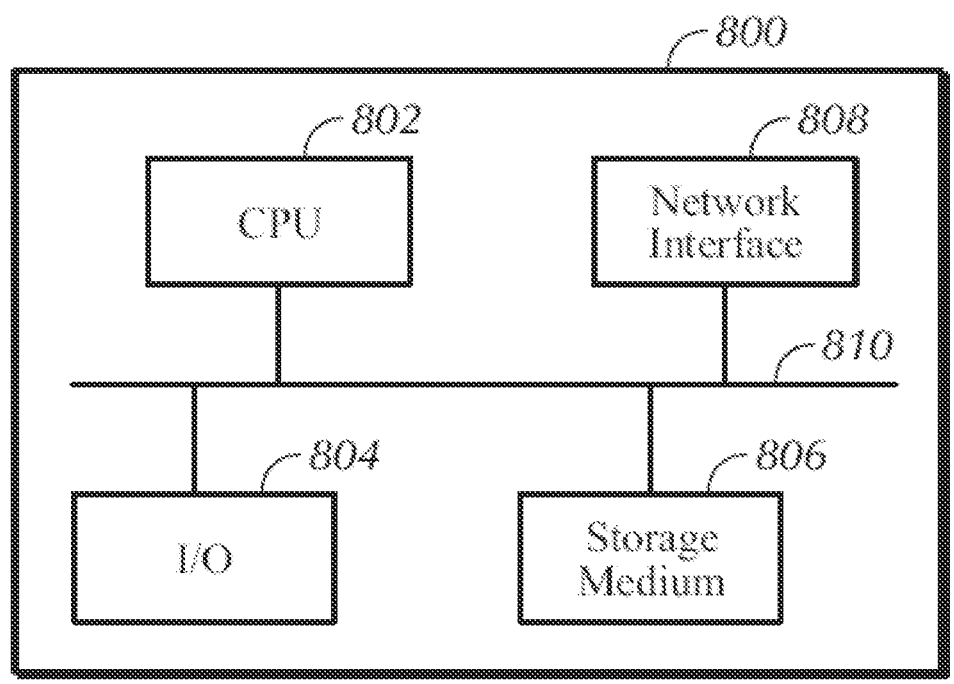
FIG. 8 is a block diagram illustrating exemplary common components of a system that can be one of the terminals and/or servers of the embodiments of the disclosure.

The non-transitory computer readable storage medium can be part of a computing system serving as the server or the cloud-connection device. FIG. 8 illustrates exemplary common components of one such computing system. As illustrated, the system 800 can include a central processing unit (CPU) 802, I/O components 804 including, but not limited to one or more of display, keypad, touch screen, speaker, and microphone, storage medium 806 such as the ones listed in the last paragraph, and network interface 808, all of which can be connected to each other via a system bus 810. The storage medium 806 can include one or more of the units of FIGS. 3-7 depending on whether the system is a first IM terminal or a second IM terminal.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A terminal interaction method, comprising:
a first instant messaging (IM) terminal receiving a user-entered file transfer command directing the first IM terminal to initiate a process for transferring a file to a second IM terminal, wherein the first IM terminal and the second IM terminal are logged into an TM platform via associated account numbers,
the first IM terminal determining whether the first IM terminal and the second IM terminal belong to a same local area network (LAN) and, in response to determining that the first TM terminal and the second IM terminal belong to the same LAN, starting a local Web server associated with the first IM terminal and generating uniform resource locator (URL) address information associated with the file, and
the first IM terminal transmitting, via the TM platform, to the second IM terminal, the address information associated with the local Web server and the URL address information associated with the file, to allow the second IM terminal to transmit, to the local Web server, in accordance with the address information associated with the local Web server, a file obtaining request including the URL address information associated with the file, and the local Web server to obtain and transmit the file to the second IM terminal in accordance with the URL address information associated with the file,
when the first IM terminal determines that the first IM terminal and the second IM terminal do not belong to the same LAN, the method comprises:
the first IM terminal uploading the file to a hub device and generating hub device URL address information associated with the file, and
the first IM terminal transmitting, via the IM platform, to the second IM terminal, the address information associated with the hub device and the hub device URL address information associated with the file, to allow the second IM terminal to transmit, in accordance with the address information associated with the hub device, to the hub device, a file obtaining request including the hub device URL address information associated with the file, and the hub device to obtain and transmit the file to the second IM terminal in accordance with the hub device URL address information associated with the file.

2. The method of claim 1, further comprising:
prior to the first IM terminal transmitting to the second IM terminal, via the IM platform, the address information associated with the hub device and the hub device URL address information associated with the file,
the first IM terminal encrypting the address information associated with the hub device and the hub device URL address information associated with the file.

3. The method of claim 1 wherein the first IM terminal determining whether the first IM terminal and the second IM terminal belong to the same LAN comprises:
the first IM terminal transmitting to the second IM terminal an Address Resolution Protocol (ARP) protocol request package and detecting whether a media access control (MAC) address returned from the second IM terminal is received within a set time, if the MAC address is received within the set time, determining that the first IM terminal and the second IM terminal belong to the same LAN, and
if the MAC address is not received within the set time, determining that the first IM terminal and the second IM terminal do not belong to the same LAN.

4. The method of claim 3, further comprising:
prior to the first IM terminal transmitting to the second IM terminal, via the IM platform, the address information associated with the hub device and the hub device URL address information associated with the file,
the first IM terminal encrypting the address information associated with the hub device and the hub device URL address information associated with the file.

5. A first instant messaging (IM) terminal, comprising:
a receiving unit that receives a user-entered file transfer command directing the first IM terminal to initiate a process for transferring a file to a second IM terminal, wherein the first IM terminal and the second IM terminal are logged into an IM platform via associated account numbers,
a determining unit that determines whether the first IM terminal and the second IM terminal belong to a same local area network,
a first processing unit that starts a local Web server on the first IM terminal and generates URL address information associated with the file when a result of a determination that the first IM terminal and the second IM terminal belong to a same local area network is positive,
a first transmitting unit that transmits, via the IM platform, to the second IM terminal, address information associated with the local Web server and the URL address information associated with the file to allow the second IM terminal to transmit, in accordance with the address information associated with the local Web server, to the local Web server a file obtaining request including the URL address information associated with the file, and the local Web server to obtain and transmit the file to the second IM terminal in accordance with the URL address information,
a second processing unit that uploads the file to a hub device and generates hub device URL address information associated with the file when the result of the determination is negative,
a second transmitting unit that transmits, via the IM platform, to the second IM terminal, the address information associated with the hub device and the hub device URL address information associated with the file to allow the second IM terminal to transmit, in accordance with the address information associated with the hub device, to the hub device, a file obtaining request including the hub device URL address information associated with the file, and the hub device to obtain and transmit the file to the second IM terminal in accordance with the hub device URL address information associated with the file.

6. The first IM terminal of claim 5, further comprising:
a second encryption processing unit that, before the second transmitting unit transmits, via the IM platform, to the second IM terminal, the address information associated with the hub device and the hub device URL address information associated with the file, encrypts the address information associated with the hub device and the hub device URL address information associated with the file and transmits the encrypted information to the second transmitting unit.

7. The first IM terminal of claim 5, wherein the determining unit transmits to the second IM terminal an ARP protocol request package and detects whether a MAC address returned from the second IM terminal is received within a set time,
if the MAC address is received within the set time, determines that the first IM terminal and the second IM terminal belong to the same LAN, and
if the MAC address is not received within the set time, determines that the first IM terminal and the second IM terminal do not belong to the same LAN.

8. The first IM terminal of claim 5, further comprising:
a first encryption processing unit that, before the first transmitting unit transmits, via the IM platform, to the second IM terminal, the address information associated with the local Web server and the URL address information associated with the file, encrypts the address information associated with the local Web server and the URL address information associated with the file, and transmits the encrypted information to the first transmitting unit.

9. A second instant messaging (IM) terminal, comprising:
a receiving unit that receives address information associated with a local Web server and URL address information associated with a file transmitted by a first IM terminal via an IM platform, wherein the address information associated with the local Web server and the URL address information associated with the file are received after the first IM terminal receives a user-entered file transfer command directing the first IM terminal to initiate a process for transferring the file to the second IM terminal and after the first IM terminal determines that the first IM terminal and the second IM terminal belong to a same LAN, wherein the first IM terminal and the second IM terminal are logged into the IM platform via associated account numbers,
a transmitting unit that transmits, in accordance with the address information associated with the local Web server, to the local Web server, a file obtaining request including the URL address information associated with the file, and
when the address information associated with the local Web server and the URL address information associated with the file transmitted by the first IM terminal via an IM terminal are encrypted, a first decryption processing unit that decrypts the address information associated with the local Web server and the URL address information associated with the file received by the receiving unit and transmits the decrypted information to the transmitting unit,
wherein the receiving unit also receives the file obtained and transmitted by the local Web server in accordance with the URL address information associated with the file.

10. The second IM terminal of claim 9,
wherein the receiving unit receives address information associated with the a hub device and hub device URL address information associated with the file transmitted by the first IM terminal, after the first IM terminal receives a user-entered file transfer command directing the first IM terminal to initiate a process for transferring the file to the second IM terminal, and after the first IM terminal determines that the first IM terminal and the second IM terminal do not belong to the same LAN, uploads the file to the hub device, and generates the hub device URL address information associated with the file,
wherein the transmitting unit transmits, in accordance with the address information associated with the hub device, to the hub device, a file obtaining request including the hub device URL address information associated with the file, and wherein the receiving unit receives the file obtained and downloaded by the hub device in accordance with the hub device URL address information associated with the file.

11. The second IM terminal of claim 10, further comprising: when the address information associated with the hub device and the hub device URL address information associated with the file transmitted by the first IM terminal via an IM terminal are encrypted, a second decryption processing unit that decrypts the address information associate with the hub device and the hub device URL address information associated with the file received by the receiving unit, and transmits the decrypted information to the transmitting unit.

12. A method of interacting with a terminal, comprising:
receiving a user-entered file transfer command for transferring a file to the terminal,
logging into a first instant messaging account,
determining whether the terminal is connected to a local area network,
if the terminal is determined to be on the local area network,
starting a Web server generating a URL address of the file,
transmitting, via the first instant messaging account, an address of the Web server and the URL address of the file to the terminal,
receiving, at the Web server, a file obtaining request including the URL address of the file from the terminal, and
transmitting the file to the terminal in response to the file obtaining request,
if the terminal is determined not to be on the local area network,
uploading the file to a hub device and generating a hub device URL address of the file,
transmitting, via the first instant messaging account, to the terminal, an address of the hub device and the hub device URL address of the file,
receiving a file obtaining request including the hub device URL address of the file from the terminal, and
transmitting from the hub device the file to be transmitted to the terminal in response to the file obtaining request.

13. The method of claim 12, further comprising: before transmitting the address of the hub device and the hub device URL address of the file to the terminal, encrypting the address of the hub device and the hub device URL address of the file.

14. The method of claim 12, wherein determining whether the terminal is connected to a local area network, comprises:
transmitting to the terminal an Address Resolution Protocol (ARP) protocol request package,
detecting whether a media access control (MAC) address returned from the terminal is received within a set time,
if the MAC address is received within the set time, determining that the terminal is connected to the local area network (LAN), and
if the MAC address is not received within the set time, determining that the terminal is not connected to the LAN.

15. The method of claim 12, further comprising: before transmitting the address of the Web server and the URL address of the file to the terminal, encrypting the address of the Web server and the URL address of the file.

16. The method of claim 12, further comprising: verifying whether the terminal is logged into a second instant messaging account associated with the first instant messaging account before transmitting any of the address of the Web server, the URL address of the file, the address of the hub device, and the hub device URL address of the file to the terminal;
wherein the second instant messaging account is associated with the first instant messaging account if
the second instant messaging account is the same as the first instant messaging account,
the second instant messaging account is in a same user group as the first instant messaging account, or
the second instant messaging account and the first instant messaging account are designated as friends.

17. The method of claim 12, wherein receiving the user-entered file transfer command for transferring the file to the terminal comprises
receiving a user command to locate the terminal using the first instant messaging account,
detecting a click on a displayed item representing the terminal after the terminal is located to open a file transmitting window, and
receiving a drag or copy operation placing the file into the file transmitting window.

* * * * *